May 21, 1957
G. R. ROESCH
2,792,720
BRAKE LEVER MECHANISM
Filed Feb. 3, 1954
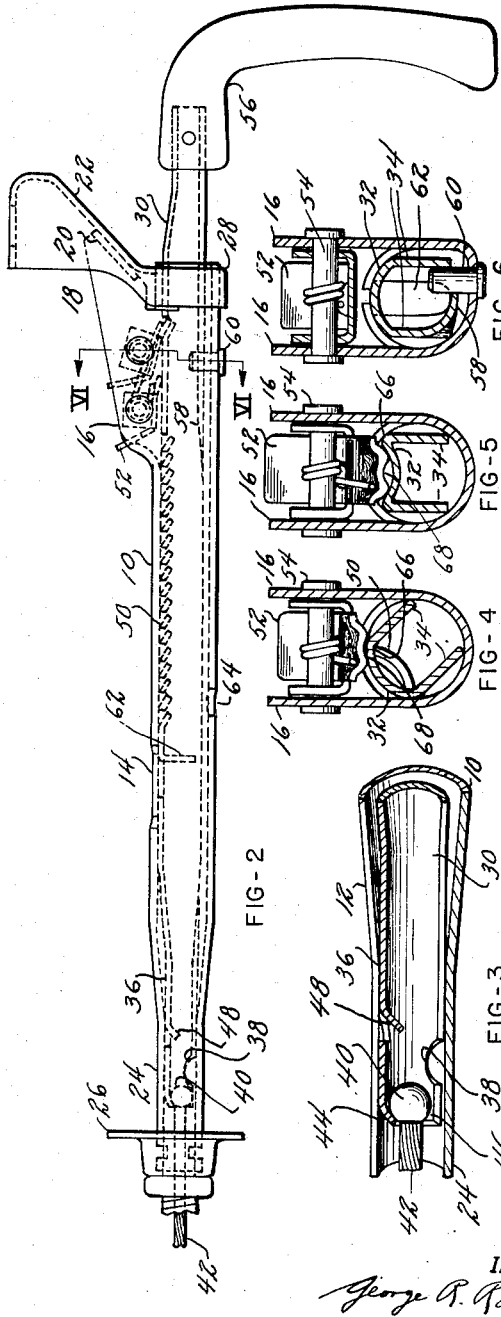
INVENTOR.
George R. Roesch.
BY
Wm. O. Ballard
his atty.

United States Patent Office 2,792,720
Patented May 21, 1957

2,792,720

BRAKE LEVER MECHANISM

George R. Roesch, Toledo, Ohio, assignor to The Rush Stamping Company, Toledo, Ohio, a corporation of Ohio Application February 3, 1954, Serial No. 407,843

3 Claims. (Cl. 74—503)

This invention relates to brake control mechanisms.

This application is a continuation-in-part of a prior filed application, which resulted in United States Letters Patent No. 2,738,686, issued March 20, 1956.

An object of this invention is to provide a new and improved straight line pull type of brake lever operating mechanism commonly known as the emergency brake lever on a motor vehicle, which control mechanism is primarily formed from sheet metal stampings.

Another object of this invention is to provide a connection between the lever and brake operating cable which securely interlocks the cable with the lever and prevents displacement of the cable anchor into the operating mechanism.

Another object of this invention is to provide a method of assembly which develops means for limiting the extent of the normal pull lever movement and thus prevents separation of the operating parts.

And another object of this invention is to provide a cooperation of parts whereby the same can automatically be reset to brake release position without positive manual control thereof.

Other objects and advantages of this invention relating to the arrangement, operation and functions of the related elements of the structure, to various details of construction, to combination of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 1 is a plan view of the brake control mechanism including features of the invention herein;

Fig. 2 is a side elevation of the device of Fig. 1;

Fig. 3 is a view on the line III—III, Fig. 1;

Fig. 4 is a vertical section through the ratchet and pawl connection between the major parts herein, showing the parts in brake releasing position;

Fig. 5 is a view similar to Fig. 4, with the parts in brake setting position;

Fig. 6 is a view on the line VI—VI, Fig. 2; and

Fig. 7 is a view on the line VII—VII, Fig. 1.

The primary supporting member 10 comprises a sheet metal tube formed to include a longitudinal open seam 12 having an intermediate enlarged portion 14 to provide access through the wall of said tube to the interior thereof, the purpose of which is more fully hereinafter described. The seam 12 at one end of the guide member 10 is also enlarged and is bounded on each side by one of a pair of outwardly extending flanges 16 provided with extensions 18 terminating in offsets 20. These offsets 20 are welded to the rear face of a bracket 22 which, in turn, may be attached to a lower edge of a motor vehicle dash by suitable fastening elements extending through apertures 23 in the upper face of said bracket.

The opposite end of the guide 10 has a reduced diameter portion 24 carried by bracket 26, which bracket may be attached by suitable fastening means to the bulkhead of a motor vehicle. The lower end of the bracket 22 provides a seat 28 for the forward end of the tubular member 10. Thus the tube 10 is mounted to provide a fixed guide extending between the dash and bulkhead of a motor vehicle at a selected position for convenient operation by the driver of said vehicle.

Reciprocably and rotatably mounted within the guide 10 is slide member 30. This slide member 30 is a sheet metal stamping, U-shaped in cross-section, having web portion 32 from which depends a pair of opposing legs or flanges 34. The forward end of the member 30 is provided with a reduced portion 36 to nest within the reduced portion 24 of the guide when the slide is thrust thereinto. Adjacent this terminus 36 of the slide, opening 38 is provided, through which an anchor 40 on the terminus of a cable 42 may be inserted to affix the cable 42 to the slide 30. The forward tip of the web 32 has turned-in portion 44, which forms a seat 46 within which the anchor 40 may nest. The cable 42 extends from the brake operating mechanism of the vehicle.

In order to prevent the anchor element 40, which is herein shown as a bead or ball, from being displaced from the seat 46 into the slide 30, the web 32 has a tongue portion 48 struck therefrom to be turned inwardly into the slide 30 adjacent the seated anchor 40. This prevents undue displacement of the anchor 40 from the seat 46, and when the slide 30 is fully nested within the guide 10, the anchor 40 is also prevented from becoming detached by the guide wall covering the opening 38.

Remote from the cable anchoring device, the web 32 is provided with a series of teeth 50 forming a ratchet therealong, which ratchet cooperates with a pair of pawls 52 mounted on pins 54 carried by the flanges 16. The slide 30 extends forwardly from the bracket 22 to mount operating handle 56. When the handle 56 is gripped and pulled to draw the slide 30 from the guide 10, the pawls 52 coact with the ratchet 50 to hold the slide in brake setting position through the pull in turn, being exerted on the cable 42. The pawls are spaced so that but one pawl engages one tooth of the ratchet at any one time, the opposite pawl being a half tooth distant, so that a nice adjustment may be had and the increments of adjustment comparatively small.

As before noted, the gripping handle 56 is pulled outwardly from the bracket 22, moving the slide 30 therewith and the pawls and teeth coact to lock the slide 30 at any given withdrawn position, thereby setting the brakes of the motor vehicle. In order to release the mechanism and telescope the slide 30 into the guide 10, it is only necessary to rock the grip 56, which in turn rocks the slide 30 within the guide, and the teeth 50 are shifted clear of the pawls 52. The normal pull of the cable 42 acted upon by the usual brake systems draws the slide 30 into the guide 10.

As the grip and slide approach their innermost positions, flange 58, which is an integrally inwardly extending offset from one of the legs 54, engages post or pin 60, fixed in the guide 10. This flange then acts as a cam to cause the slide 30 to be rocked back to its normal or starting position, and the complete return is effective as the slide 30 reaches its innermost position. The outer edge of the flange 58 may be contoured to fit the exact movement desired during the reset of the brake.

In order to prevent any possible separation of the major parts by the withdrawal of the slide 30 from the guide 10, the web 32 has a tongue 62 outlined therein, and in the assembly of the mechanism this tongue 62 is shifted into registry with the region 14 of the guide 10. A suitable tool may then be inserted through the open region 14 to bend the tongue 62 downwardly to form a projection in alignment with the pin 60. This provides an effective stop preventing the slide 30 from being entirely withdrawn from the slide 10. In the event of some extraordinary condition, it may require a separation of the slide from the guide, an aperture 64 is provided diametrically opposite from the clearway 14, which allows the stop 62 to be drawn into registry therewith, and a tool could then be inserted through the aperture 64 to replace the tongue 62 back into the web 32, thus permitting a withdrawal of the slide from the guide. Reassembly could be effected as hereinbefore defined.

In the disclosure herein, the region 66 between the web 32 and the legs 34 on the slide is provided with a relatively large arcuate surface, and the pawls 52 in turn have their slide engaging edges 68 similarly contoured so that the edges 66 cooperatively conform therewith. Thus, if an operator of the brake rotates the handle to release the brake, and through some intentional or non-intentional movement withdraws his hand from the brake, the cable 42 will draw the slide into the guide 10 without positive manual pressure being exerted upon the handle 56. This automatic brake release is provided as the lateral curvature of the pawls holds the slide 30 in rocked position until the cam 58 engages the pin 60 to reset the device. This automatic resetting removes the necessity of an operator gripping the handle 56 and positively pushing the slide fully into the guide. Such action is effected through the cooperating contours of the slide edges 66 and the complementary pawl seats 68.

It is to be understood that the above description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed and desired to secure by United States Letters Patent:

1. In a brake controlling mechanism of the class described, a tubular guide member, a slide reciprocable and rockable in said guide member, said slide being of U-shape in cross-section providing a web with a pair of opposing legs extending therefrom, the connections between said web and legs comprising smooth arcuate continuations from the web to the legs, said web having teeth to provide a ratchet, pawls mounted by said guide to coact with said ratchet, said pawls having their ratchet engaging edges laterally contoured to complement the said slide arcuate regions and adapted to cooperatively conform therewith.

2. In a brake controlling mechanism of the class described, a tubular guide member, a slide reciprocable and rockable in said guide member, said slide being of U-shape in cross-section providing a web with a pair of opposing legs extending therefrom, a ratchet and pawl connection between said web and guide member holding said slide in incremental positions relative to said guide, said slide being rockable to release said pawl and ratchet connection for free movement of said slide within the guide, one of said legs having a flange extending into the slide in substantial parallelism with the axis thereof, having a free terminal edge contoured to provide a predetermined cam, a post carried by said guide to be engaged by said edge to cam the slide into ratchet and pawl engagement when said slide is substantially telescoped within the slide, and a projection from said web turned into the slide remote from said flange, said projection being in substantial alignment with said post.

3. In a brake controlling mechanism of the class described, a tubular guide member, a slide reciprocable and rockable in said guide member, said slide being of U-shape in cross-section providing a web with a pair of opposing legs extending therefrom, a ratchet and pawl connection between said web and guide member holding said slide in incremental positions relative to said guide, said slide being rockable to release said pawl and ratchet connection for free movement of said slide within the guide, one of said legs having a flange extending into the slide in substantial parallelism with the axis thereof, having a free terminal edge contoured to provide a predetermined cam, a post carried by said guide to be engaged by said edge to cam slide into ratchet and pawl engagement when said slide is substantially telescoped within the slide, a projection from said web turned into the slide remote from said flange, said projection being in substantial alignment with said post, and said guide being provided with a pair of substantially diametrically disposed apertures with which said projection may be placed in registry by movement of the slide within the guide.

References Cited in the file of this patent

UNITED STATES PATENTS

| | | |
|---|---|---|
| 1,908,206 | Winning | May 9, 1933 |
| 2,271,799 | McCarthy | Feb. 3, 1942 |
| 2,543,510 | Sandberg | Feb. 27, 1951 |
| 2,553,025 | Weber et al. | May 15, 1951 |
| 2,591,495 | Baldwin et al. | Apr. 1, 1952 |
| 2,635,481 | De Orlow | Apr. 21, 1953 |
| 2,637,218 | Hinsey | May 5, 1953 |
| 2,644,343 | Roesch | July 7, 1953 |
| 2,738,686 | Roesch | Mar. 20, 1956 |